United States Patent [19]

Pillifant, Jr.

[11] 4,374,376

[45] Feb. 15, 1983

[54] VEHICLE WARNING DEVICE

[76] Inventor: Harold E. Pillifant, Jr., 3522 W. Dunlap, #214, Phoenix, Ariz. 85021

[21] Appl. No.: 280,458

[22] Filed: Jul. 6, 1981

[51] Int. Cl.³ .................. B60Q 1/26; G09F 15/00
[52] U.S. Cl. ................................. 340/84; 40/124.1; 40/610; 116/28 R; 116/63 P; 340/90
[58] Field of Search ............ 40/591, 610, 612, 124.1; 116/28, 63 P; 340/84, 90

[56] References Cited

U.S. PATENT DOCUMENTS

| | | | |
|---|---|---|---|
| 2,645,977 | 7/1953 | Wilford | 116/28 R |
| 3,176,419 | 4/1965 | Stein | 40/610 |
| 3,322,093 | 5/1967 | Goland et al. | 40/610 |
| 3,471,958 | 10/1969 | Westin | 40/124.1 |
| 3,946,509 | 3/1976 | McCaffrey | 116/28 R |
| 4,182,063 | 1/1980 | Klosel | 116/63 P |

*Primary Examiner*—Donald J. Yusko
*Attorney, Agent, or Firm*—Cahill, Sutton & Thomas

[57] ABSTRACT

A warning device suitable for use in conjunction with a disabled vehicle is constructed from one or more flat sheets of a foldable material and includes a base portion, a pair of upright portions secured to each other in back-to-back relationship, and a pair of sloping portions extending upwardly from the base portion to the upright portions. A flap extends downwardly from the base of the warning device for insertion between the body of the vehicle and the opened hood or trunk thereof, the flap serving to anchor the warning device to the vehicle when the hood or trunk is closed. Warning indicia, such as reflective striping, is applied to the outward faces of the upright portions and sloping portions of the warning device. A bi-directional warning light is incorporated within the upright portions of the warning device for added visibility.

24 Claims, 10 Drawing Figures

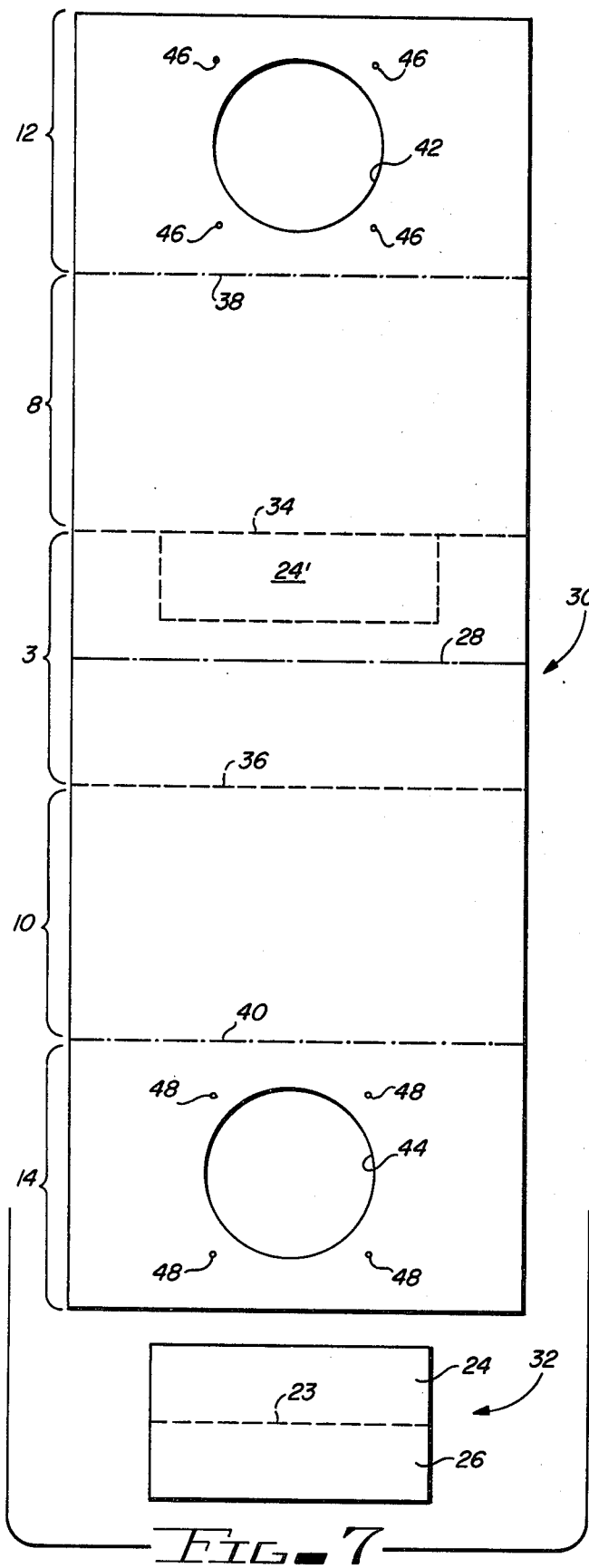
_FIG-7_
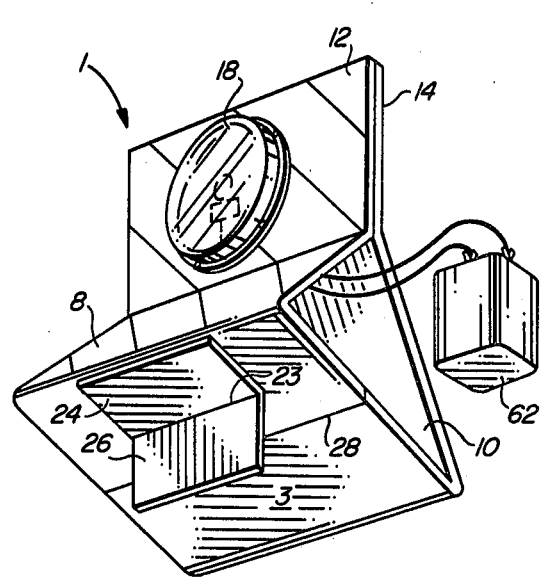
_FIG-8_
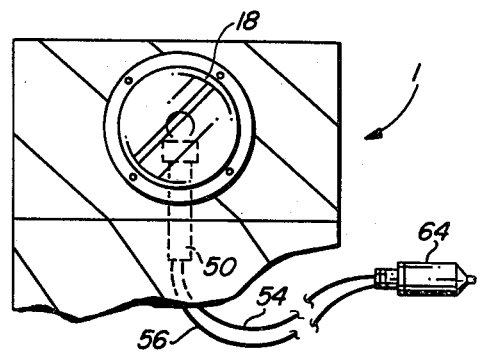
_FIG-9_
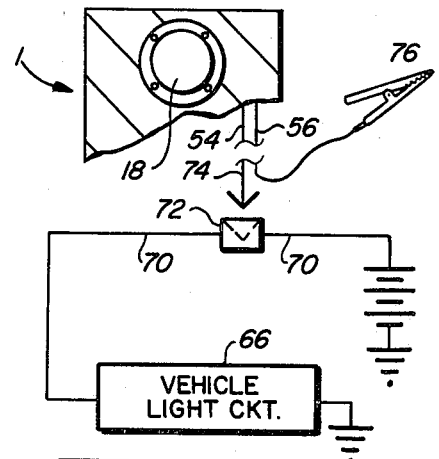
_FIG-10_

VEHICLE WARNING DEVICE

CROSS REFERENCE TO RELATED APPLICATIONS

Patent application Ser. No. 162,123, filed on June 23, 1980 by Harold E. Pillifant, Jr., entitled "TRAFFIC BARRICADE," which application is a continuation-in-part of patent application Ser. No. 080,470, filed on Oct. 1, 1979, by Harold E. Pillifant, Jr., and entitled "DISPOSABLE TRAFFIC BARRICADE," now U.S. Pat. No. 4,253,777, issued March 3, 1981.

BACKGROUND OF THE INVENTION

1. Field of the Invention

The present invention relates generally to warning devices of the type used to warn oncoming motorists of the presence of a disabled vehicle, and more particularly, to a warning device having a base portion from which a flap extends downwardly for insertion between the opened hood or trunk of the vehicle and the body of the vehicle for anchoring the warning device to the vehicle when the hood or trunk is closed.

2. Description of the Prior Art

In the event that a car, truck, or other vehicle becomes disabled upon a road or highway, it is desirable to warn oncoming vehicles of the presence of the disabled vehicle in order to reduce the possibility of a collision between an oncoming vehicle and the disabled vehicle. The need to clearly mark the location of the disabled vehicle is particularly critical after dark when visibility is poorest.

Recently manufactured cars and trucks are typically equipped with an emergency warning flasher mechanism for causing the front and rear parking lights or directional lights to flash on and off periodically. However, a failure of the vehicle's electrical system renders such warning systems inoperable. Moreover, the parking lights or directional lights operated by such manufacturer equipped warning systems are located relatively close to the ground, therefore restricting to some extent their visibility to oncoming motorists. Furthermore, many older vehicles still being driven over the roads today are not equipped with such emergency warning flasher systems.

Warning devices other than manufacturer equipped emergency warning systems are also widely known and used, such as safety flares, reflectors which rest upon the ground, and warning lights which may be secured to the vehicle by suction cups or magnets. Safety flares, although highly visible, burn out rather quickly, and many individuals are reluctant to use such flares for fear of burning themselves. Ground-supported reflectors aid in marking the location of a disabled vehicle but are often blown over during windy conditions, are necessarily located close to the ground, and are not conveniently carried within a vehicle for use during emergency situations. Warning lights that attach to the upper portion of the vehicle by suction cups, magnets, or the like, may be positioned relatively high off the ground for good visibility and are relatively immune to adverse wind conditions; however, such warning indicators are often relatively expensive, are usually of complex construction, are relatively heavy, and are not easily stored within the vehicle when not in use. Moreover, lighted warning devices of the type which adhere to a vehicle by suction cups or by magnets may easily be removed by unauthorized persons when the disabled vehicle is unattended.

Accordingly, it is an object of the present invention to provide a warning device for use with a disabled vehicle to warn approaching motorists of the presence of the disabled vehicle, which warning device is lightweight, inexpensive, and relatively simple to construct and use.

It is another object of the present invention to provide such a warning device which can be secured to a vehicle at approximately windshield level for allowing the warning device to be more readily visible at a greater distance to oncoming motorists than warning devices disposed at ground level or taillight level.

It is still another object of the present invention to provide such a warning device which can easily and conveniently be locked to the disabled vehicle in a manner which prevents the warning device from being blown away by high winds or from being removed by unauthorized persons.

It is a further object of the present invention to provide such a warning device which is foldable into a compact structure when not in use for convenient storage within the trunk or other portion of the vehicle.

These and other objects of the present invention will become more apparent to those skilled in the art as the description thereof proceeds.

SUMMARY OF THE INVENTION

Briefly described, and in accordance with one embodiment thereof, the present invention relates to a warning device suitable for use with a disabled vehicle to warn approaching motorists of the presence of the disabled vehicle, the warning device including a base, an upright panel supported by the base and extending upwardly therefrom and having warning indicia thereon, and a flap extending downwardly from the base. The flap is inserted between the opened hood or trunk of the disabled vehicle and the body of the vehicle in order to firmly anchor the base of the warning device to the disabled vehicle upon closure of the hood or trunk, respectively.

The warning device may be constructed from one or more flat sheets of a foldable material such as corrugated plastic sheeting, waterproofed cardboard, or the like. In one embodiment of the present invention, a single flat sheet of foldable material has a first pair of score lines for folding in a first direction for defining a base region between such score lines. The flat sheet of foldable material also has a second pair of score lines for folding in an opposite direction, the second pair of score lines bordering first and second upright portions of the flat sheet. The first and second upright portions are secured in back-to-back relationship and extend substantially perpendicular to the base portion. The flap that extends downwardly from the base portion may be formed from a piece of foldable material having a flap score line formed therein for defining a first region that can be folded downwardly away from the base portion.

In an alternate embodiment of the invention, first and second flat sheets of foldable material are each provided with first and second score lines for folding in opposite directions, the first score lines bordering base portions of the first and second flat sheets, and the second score lines bordering upright portions of the first and second flat sheets. The upright portions are secured to one another in back-to-back relationship, and a lower one of the base portions is overlapped by the other (upper)

base portion and secured thereto in order to form the base of the warning device. When utilizing this embodiment of the invention, the lower base portion that is overlapped by the upper base portion may advantageously include an additional score line for allowing the end of such base portion to be folded downwardly to form the flap.

An adhesive-backed, striped, reflective sheeting or film is preferably applied to the exposed surfaces of the warning device to increase night visibility. In addition, lenses may be secured to the front faces of the upright portions of the warning device, and a light source may be disposed between such lenses for simultaneously directing light in opposite directions through each of the lenses.

BRIEF DESCRIPTION OF THE DRAWINGS

FIG. 7 is a top view of a flat sheet of foldable material formed so that it may be folded into the warning device shown in FIG. 1.

FIGS. 8–10 illustrate alternate methods of providing electrical power to the flashing warning light incorporated within the warning device.

DETAILED DESCRIPTION OF THE PREFERRED EMBODIMENT

Figure 1:
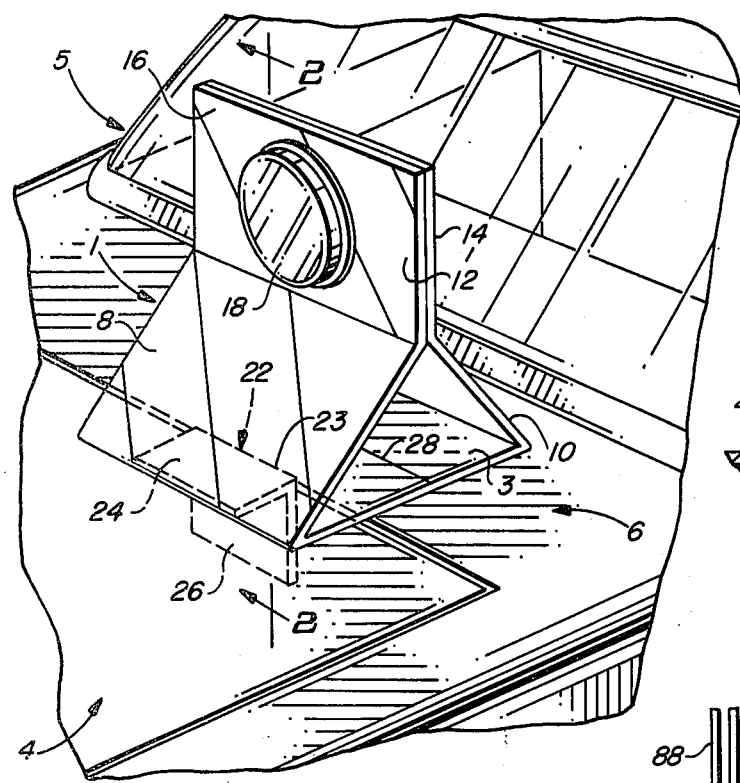
FIG. 1 is a perspective view of a warning device constructed according to the teachings of the present invention and anchored to a disabled vehicle.

The vehicle warning device shown in FIG. 1 is designated generally by reference numeral 1 and includes a generally planar base portion 3 which is supported partly by the trunk or hood 4 of a disabled vehicle 5 and partly by the deck portion 6 of the vehicle body adjacent the hinged edge of trunk or hood 4.

Extending upwardly from opposing edges of base portion 3 are first and second sloping portions 8 and 10, respectively, which converge upwardly toward one another for supporting first and second upright portions or panels 12 and 14, respectively. Upright portions 12 and 14 are secured in back-to-back contact with each other and extend substantially perpendicular to base portion 3.

Figure 3:
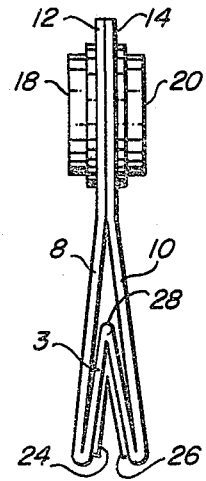
FIG. 3 is a side view of the warning device when folded into its storage position.

As shown in FIGS. 1 and 3, the outwardly facing surfaces of upright portions 12 and 14 and sloping portions 8 and 10 are covered by warning indicia such as alternating stripes colored white and safety orange. To improve night visibility of the warning device, such stripes are preferably formed by a reflective film, such as a reflective tape or paint. In the preferred embodiment of the present invention, striped, reflective, adhesive-backed sheeting 16 (see FIG. 3) is applied over the outwardly facing surfaces of the vehicle warning device.

To further improve visibility of the vehicle warning device, a flashing light source, including lenses 18 and 20, may be incorporated within the upright portions 12 and 14 of the vehicle warning device for periodically flashing a warning signal. The preferred manner in which the flashing light source is constructed is described in further detail below.

Figure 2:
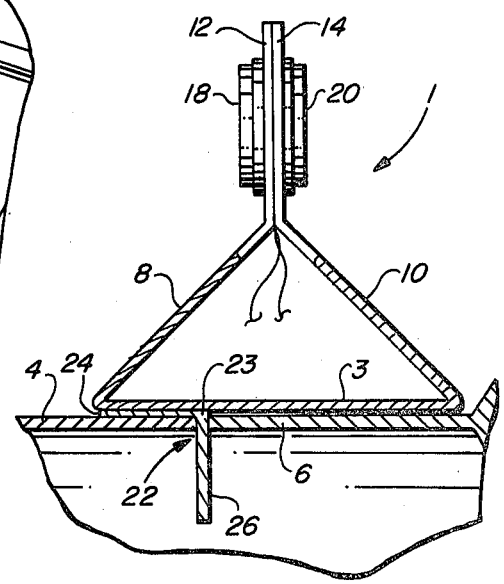
FIG. 2 is a cross-sectional side view taken through lines 2—2 shown in FIG. 1.

With reference to FIGS. 1 and 2, the vehicle warning device also includes a flap, designated generally by reference numeral 22, for anchoring base portion 3 of the vehicle warning device to the disabled vehicle. Within the embodiment of the invention illustrated in FIGS. 1 and 2, flap 22 is shown as being made from a foldable material having a central flap score line 23 dividing the flap into a first region 24 and a second region 26. Region 24 is secured to the underside of base portion 3, while second region 26 is folded downwardly from score line 23 for insertion between the vehicle body and the hinged edge of hood or trunk 4. In order to facilitate the insertion of flap 22 between the car body and hood or trunk 4, the user simply opens the hood or trunk by a sufficient amount to create a gap between the hinged edge of the hood or trunk and the car body. Flap 22 is then extended downwardly through the gap, and hood or trunk 4 is then closed and locked. In this manner, the vehicle warning device may be quickly and conveniently deployed while being firmly anchored to the vehicle for resisting high winds and removal by unauthorized persons.

As shown in FIGS. 1 and 3, base portion 3 preferably includes a hinged or foldable central axis 28 for folding base portion 3 in half. The hinge or fold 28 within base portion 3 allows the warning device to be collapsed into the compact structure shown in FIG. 3 for convenient storage when not in use.

The vehicle warning device described above with reference to FIGS. 1–3 may advantageously be constructed from one or more flat sheets of relatively inexpensive, semi-rigid, foldable material. Preferably, double-faced corrugated plastic sheeting, such as four mil extruded polyethylene, is used because such material exhibits extreme bursting and tear strength, is impervious to all weather conditions, and can be treated for resistance to ultraviolate radiation from intense sunlight. This plastic material may be Corona treated so that it may be printed. In addition, such material can be easily die-cut and folded. However, other foldable materials may also be used; for example, heavy weight corrugated cardboard has been found to operate satisfactorily and can be waterproofed by coating the cardboard with wax or plastic or by impregnating the cardboard with a resin in a well known manner.

A preferred method for constructing the vehicle warning device shown in FIG. 1 is illustrated in FIG. 7 wherein a first flat sheet of foldable material 30 is used to form base portion 3, sloping portions 8 and 10, and upright portions 12 and 14 of the vehicle warning device, and a second smaller sheet of foldable material 32 is used to form the flap 22 secured to the underside of base portion 3. As shown in FIG. 7, flat sheet 30 is an elongated rectangular sheet of foldable material having a central axis 28. A first pair of score lines 34 and 36 are disposed symmetrically about and parallel to central axis 28. Score lines 34 and 36 are made so as to facilitate the folding of flat sheet 30 in a first direction for defining base portion 3 of the vehicle warning device.

Still referring to FIG. 7, a second pair of score lines 38 and 40 are also symmetrically disposed about central axis 28 and extend parallel thereto. Score lines 38 and 40 are disposed further from central axis 28 than are score lines 34 and 36 and are made so as to facilitate the folding of flat sheet 30 in a second direction opposite to the direction in which score lines 34 and 36 are folded. Accordingly, the second pair of score lines 38 and 40 are represented by dashed-dot lines, while the first pair of score lines 34 and 36 are represented by dashed lines. Score lines 38 and 40 border first and second upright portions 12 and 14, respectively. When the vehicle warning device is assembled, the area of flat sheet 30 extending between score lines 34 and 38 forms first sloping portion 8, and the area of flat sheet 30 extending between score lines 36 and 40 forms second sloping portion 10. Preferably, central axis 28 is also scored to permit the vehicle warning device to be collapsed into the compact structure shown in FIG. 3.

Still referring to FIG. 7, first and second holes 42 and 44 are cut within upright portions 12 and 14, respectively, to accommodate the warning light incorporated within the vehicle warning device. Holes 42 and 44 are each of a diameter slightly smaller than the diameter of lenses 18 and 20. A plurality of smaller holes 46 and 48 are also cut within upright portions 12 and 14, respectively, surrounding holes 42 and 44 for receiving threaded fasteners (not shown) used to attach lenses 18 and 20 to the front faces of upright portions 12 and 14.

The second smaller flat sheet of foldable material 32, shown in FIG. 7, is used to form the flap that is secured to the underside of base portion 3 and includes a central score line 23 for defining first and second flap regions 24 and 26. Flap region 24 is subsequently secured to the underside of base portion 3 adjacent the dashed area designated by reference numeral 24' of flat sheet 30.

Flat sheets 30 and 32 can be appropriately die-cut and scored or stamped in the manner described using readily available sheet material handling machinery without the requirement for special tools or tooling. Following the cutting and scoring of sheets 30 and 32, reflective sheeting 16 is applied to the outwardly facing or front surfaces of sloping portions 8 and 10 and upright portions 12 and 14. Subsequent to the application of the reflective sheeting, a tubular, flattened post or guide 50 is glued to the back side of upright portion 14 for supporting a lighting assembly 52 concentric with hole 44 and for guiding electrical leads 54 and 56 below upright portion 14, as shown in the cutaway portion of FIG. 6. The back (non-reflective) sides of upright portions 12 and 14 are then secured to one another in back-to-back contact with holes 42 and 44 coincident with one another. Conventional methods of attachment may be used to secure the back sides of upright portions 12 and 14 to one another, for example, the use of contact cement or other bonding material. In the event that the foldable material from which flat sheet 30 is made is extruded polyethylene, then the back sides of upright portions 12 and 14 may be secured to one another by electronic welding. Flap region 24 may be secured to the underside of base portion 3 in a manner similar to that used to secure the back sides of upright portions 12 and 14 to one another.

Warning light assembly 52 may be any suitable self-flashing low-voltage light source, such as bi-metal flashing bulb No. 407 commercially available from General Electric Company. Lenses 18 and 20 are preferably amber in color and may be formed of either a conventional plastic or high-impact polycarbonate (such as the material commercially sold under the trademark "LEXAN"). A plurality of holes 46' and 48' are formed within the outer periphery of lenses 18 and 20, respectively, corresponding in number and positional arrangement to the plurality of holes 46 and 48 within upright portions 12 and 14, respectively. Threaded fasteners (not shown) are extended through holes 46', 46, 48, and 48' and tightened to draw lenses 18 and 20 toward one another, thereby clamping lenses 18 and 20 against the front sides of upright portions 12 and 14, respectively.

Figure 6:
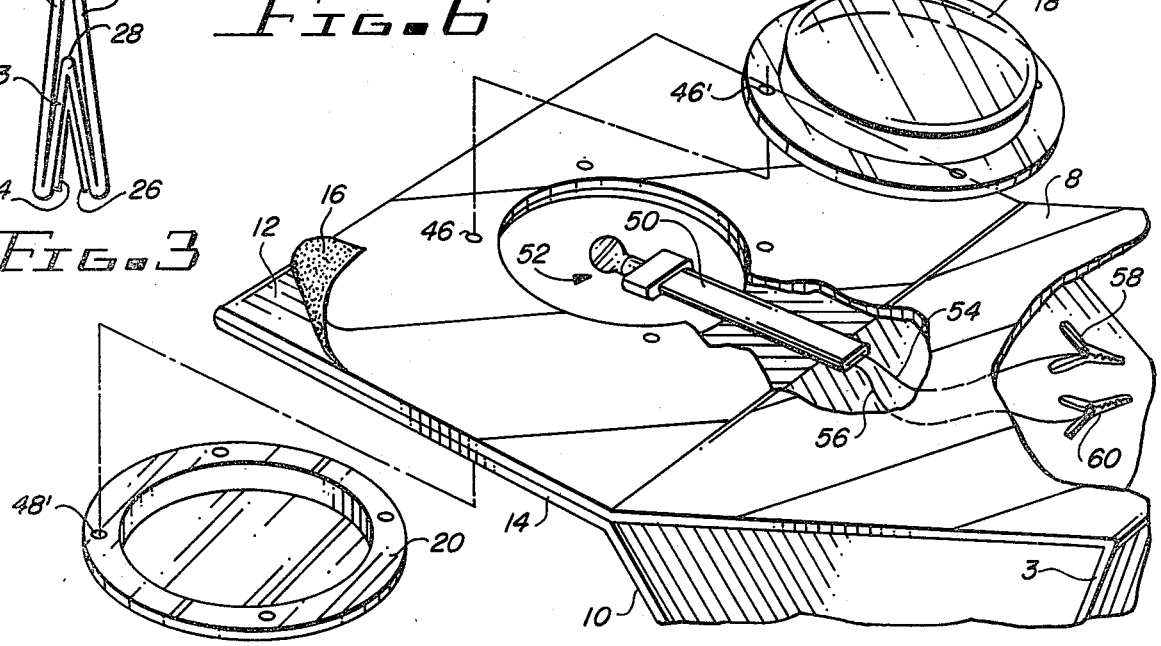
FIG. 6 is a cutaway enlarged perspective view of the warning device illustrating a flashing warning light incorporated within the upright portions of the warning device.

As shown in FIG. 6, flattened tubular guide 50 contains electrical lead wires 54 and 56, which lead wires are coupled to the flashing light assembly 52 for supplying electrical power thereto. The ends of lead wires 54 and 56 opposite flashing light assembly 52 may be provided with alligator clips 58 and 60 (see FIG. 6) for allowing convenient connection to a low voltage battery 62 as shown in FIG. 8. Assuming that battery 62 is independent from the battery which powers the vehicle's electrical system, the warning light may be operated even if the vehicle's electrical system has failed. Alternatively, lead wires 54 and 56 may be made several feet long and coupled to a plug 64 adapted to be inserted within a cigarette lighter socket provided within the instrument panel or dashboard of the disabled vehicle for deriving electrical power from the vehicle's battery, as shown in FIG. 9. Still another method of powering the warning light is shown within FIG. 10 wherein the conventional vehicle lighting circuit is shown schematically by block 66 and vehicle battery 68. One terminal of the vehicle light circuit 66 and one terminal of battery 68 are each grounded to the vehicle chassis. The positive terminal of the battery 68 is typically coupled through a fuse and a control switch (not shown) by conductor 70 to vehicle light circuit 66. An accessory jack 72 may be spliced into conductor 70 in the vicinity of the trunk or hood for releasably receiving a plug 74 coupled to lead wire 54 for supplying a positive voltage thereto. Lead wire 56 may be coupled to a conventional alligator clip 76 which may be clipped to the chassis to provide a ground return path. In the event that the voltage of the vehicle battery exceeds the maximum voltage that can be utilized by flasher assembly 52, then a voltage converter may easily be incorporated within plug 64 or within jack 72 to reduce the voltage supplied to flasher assembly 52.

Figures 4, 5:
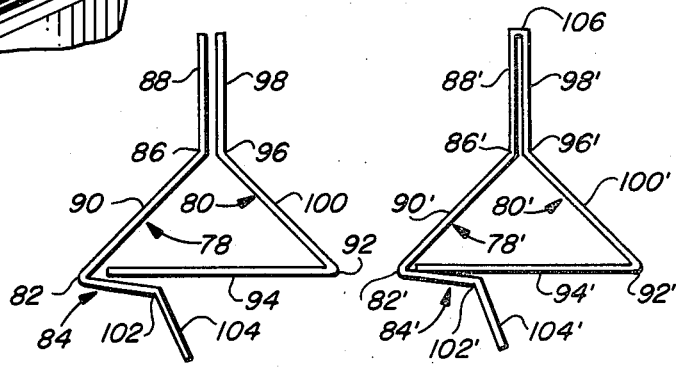
FIG. 4 and FIG. 5 are side elevational views illustrating alternate methods of constructing the warning device from one or more sheets of a foldable material.

Shown in FIGS. 4 and 5 are elevational side views of similar vehicle warning devices constructed by alternate methods. The warning device shown in FIG. 4 is made of first and second sheets of foldable material, while the warning device shown in FIG. 5 is made of a single sheet of foldable material which has been folded in a manner which effectively provides the first and second flat sheets shown in FIG. 4. Referring first to the embodiment shown in FIG. 4, a first flat sheet designated generally by reference numeral 78 includes a first score line 82 for folding in a first direction and forming a border of a first base portion 84. First flat sheet 78 also includes a second score line 86 for folding in a direction opposite to that for score line 82, score line 86 forming a border of a first upright portion 88. A first sloping portion 90 of flat sheet 78 extends between score lines 82 and 86. Similarly, second flat sheet 80 includes a first score line 92 for folding in a first direction and forming a border of a second base portion 94. Second flat sheet 80 also includes a second score line 96 for folding in a second direction opposite to that for score line 92, score line 96 forming a border of a second upright portion 98. A second sloping portion 100 extends between score lines 92 and 96.

The back sides of upright portions 88 and 98 are secured in back-to-back contact with each other in a manner identical to that used for upright portions 12 and 14 for the embodiment of the invention shown in FIG. 1. In order to form the base of the warning device, base portion 94 is extended over base portion 84 and secured thereto, thereby maintaining score lines 82 and 92 in spaced apart relationship. The downwardly extending flap needed to anchor the base portion of the warning device may advantageously be provided by forming an additional score line 102 within base portion 84 for folding in a direction opposite to that for score line 82 in order to provide flap 104.

Referring now to FIG. 5, the method of construction is almost identical to that described above with regard to FIG. 4, except that first and second flat sheets 78' and 80' are formed from a single flat sheet of foldable material which has been scored and folded along a score line 106 parallel to and equidistant from second score lines 86' and 96' of the first and second flat sheets, respectively.

The base portions 94 and 94' of the warning devices shown in FIGS. 4 and 5, respectively, preferably include a centrally located score line (not shown) analogous to score line 28 within base portion 3 of the warning device shown in FIG. 1 for allowing such warning devices to be collapsed into a compact structure similar to that shown in FIG. 3. Warning indicia, such as reflective sheeting, and/or a warning light, may be applied to or incorporated within the warning devices shown in FIGS. 4 and 5 in a manner identical to that described above with regard to the warning device shown in FIG. 1.

Those skilled in the art will now appreciate that a vehicle warning device has been described, which warning device may be easily and inexpensively constructed, is lightweight and simple to use, is collapsible for convenient storage within the vehicle when not in use, and which may be quickly and conveniently anchored to the vehicle in a manner which prevents the warning device from being blown over by high winds or from being removed by unauthorized persons. While the invention has been described with reference to several preferred embodiments thereof, the description is for illustrative purposes only and is not to be construed as limiting the scope of the invention. Various modifications and changes may be made by those skilled in the art without departing from the true spirit and scope of the invention as defined by the appended claims.

I claim:

1. A warning device for use with a disabled vehicle to warn approaching motorists of the presence of the disabled vehicle, said warning device comprising in combination:
   a. a base;
   b. a panel supported by said base and extending upwardly therefrom, said panel having warning indicia thereon, said warning indicia including a light source; and
   c. flap means secured to said base and extendible downwardly therefrom for insertion between the opened hood or trunk of the disabled vehicle and the body of the vehicle in order to anchor said base of said warning device to the disabled vehicle upon closure of the hood or trunk respectively.

2. A warning device as recited by claim 1 wherein said warning indicia includes a reflective film applied to said panel.

3. A warning device as recited by claim 2 wherein said reflective film comprises striped, reflective, adhesive-backed sheeting.

4. A warning device as recited by claim 1 wherein said panel has a hole formed therein and wherein said light source includes:
   a. first and second lenses attached to opposing sides of said panel and disposed centrally over the hole therein; and
   b. lighting means disposed between said first and second lenses for simultaneously directing light in opposite directions through each of said first and second lenses.

5. A warning device as recited by claim 1 wherein said base, said panel, and said flap are all made of a foldable material.

6. A warning device as recited by claim 5 wherein said foldable material is corrugated plastic sheeting.

7. A warning device as recited by claim 1 wherein said base is generally planar when said warning device is anchored to the disabled vehicle, and wherein said panel extends substantially perpendicular to said base.

8. A warning device for use with a disabled vehicle to warn approaching motorists of the presence of the disabled vehicle, said warning device comprising in combination:
   a. a flat sheet of foldable material having a central axis and having a first pair of score lines symmetrically disposed about said central axis and extending parallel thereto for folding in a first direction, said first pair of score lines forming borders of a base portion of said warning device, said flat sheet also having a second pair of score lines symmetrically disposed about said central axis and extending parallel thereto for folding in a second direction opposite to said first direction, said second pair of score lines being disposed further from said central axis than said first pair of score lines, said second pair of score lines forming borders of a first and a second upright portion of said warning device, said first and second upright portions extending substantially perpendicular to said base portion when said warning device is in use, each of said first and second upright portions having front and back sides, said flat sheet also having first and second sloping portions extending from said first and second upright portions to said base portion, respectively;
   b. warning indicia disposed upon the front sides of said first and second upright portions;
   c. means for securing said first and second upright portions in back-to-back contact with each other with the front sides thereof facing in opposite directions; and
   d. a flap secured to and downwardly extendible from said base portion for insertion between the opened hood or trunk of the disabled vehicle and the body of the vehicle in order to anchor said base portion of said warning device to the disabled vehicle upon closure of the hood or trunk, respectively.

9. A warning device as recited by claim 8 wherein said flap is made of a foldable material having a flap score line formed therein for defining first and second regions of said flap, the first region of said flap being secured to the bottom of said base portion and said second region being foldable along said flap score line downwardly away from said base portion.

10. A warning device as recited by claim 8 wherein said base portion includes a third score line along said central axis for allowing said warning device to be folded substantially flat when not in use.

11. A warning device as recited by claim 8 wherein said first and second upright portions each have a hole formed therein, and wherein said warning device further includes:
   a. first and second lenses attached to the front sides of said first and second upright portions, respectively, and disposed centrally over the holes formed therein; and
   b. lighting means disposed between said first and second lenses for simultaneously directing light in opposite directions through each of said first and second lenses.

12. A warning device as recited by claim 8 wherein said first and second upright portions and said first and second sloping portions each have a reflective film applied thereto.

13. A warning device as recited by claim 12 wherein said reflective film comprises striped, reflective, adhesive-backed sheeting.

14. A warning device as recited by claim 8 wherein said flat sheet of foldable material is made of corrugated plastic sheeting.

15. A warning device as recited by claim 8 wherein said first and second upright portions extend substantially perpendicular to said base portion when said warning device is being used.

16. A warning device for use with a disabled vehicle to warn approaching motorists of the presence of the disabled vehicle, said warning device comprising in combination:
   a. a first flat sheet of foldable material having a first score line for folding in a first direction, said first score line forming the border of a base portion of said first flat sheet, said first flat sheet also having a second score line for folding in a second direction, said second score line forming a border of an upright portion of said first flat sheet, said first flat sheet having a sloping portion extending between said first and second score lines when said warning device is being used, said upright portion of said first flat sheet having front and back sides;
   b. a second flat sheet of foldable material having a first score line for folding in the first direction, said first score line forming the border of a base portion of said second flat sheet, said second flat sheet also having a second score line for folding in the second direction, said second score line forming a border of an upright portion of said second flat sheet, said second flat sheet having a sloping portion extending between said first and second score lines thereof when said warning device is being used, said upright portion of said second flat sheet having front and back sides;
   c. means for securing said base portion of said first flat sheet in overlying relationship with said base portion of said second flat sheet while maintaining said first score lines thereof in spaced apart relationship to form a base of said warning device;
   d. means securing said upright portions of said first and second flat sheets in back-to-back contact with each other with the front sides thereof facing in opposite directions;
   e. warning indicia disposed upon the front sides of said upright portions of said first and second flat sheets; and
   f. a flap secured to said base of said warning device and extendible downwardly therefrom for insertion between the opened hood or trunk of the disabled vehicle and the body of the vehicle in order to anchor said base of said warning device to the disabled vehicle upon closure of the hood or trunk, respectively.

17. A warning device as recited by claim 16 wherein said first flat sheet and said second flat sheet are formed from a single flat sheet of foldable material folded along a score line parallel to and equidistant from said second score lines of said first and second flat sheets.

18. A warning device as recited by claim 16 wherein said base portion of said second flat sheet overlaps said base portion of said first flat sheet and wherein said base portion of said first flat sheet includes an additional score line foldable in the second direction to form said flap.

19. A warning device as recited by claim 16 wherein at least one of said base portions of said first and second flat sheets includes an additional score line centrally disposed within the base of said warning device and parallel to said second score lines for allowing said warning device to be folded substantially flat when not in use.

20. A warning device as recited by claim 16 wherein each of said upright portions of said first and second flat sheets has a hole formed therein, and wherein said warning device further includes:
   a. first and second lenses secured to the front sides of said upright portions of said first and second flat sheets, respectively, and centrally disposed over the holes formed therein; and
   b. lighting means disposed between said first and second lenses for simultaneously directing light in opposite directions through each of said first and second lenses.

21. A warning device as recited by claim 16 wherein said upright portions and said sloping portions of said first and second flat sheets each have a reflective film applied thereto.

22. A warning device as recited by claim 21 wherein said reflective film comprises striped, reflective, adhesive-backed sheeting.

23. A warning device as recited by claim 16 wherein said first and second flat sheets are made of corrugated plastic sheeting.

24. A warning device as recited by claim 16 wherein said upright portions of said first and second flat sheets extend substantially perpendicular to the base portions thereof when said warning device is being used.

* * * * *